(No Model.)

C. T. MASON, Sr.
ELECTRIC MOTOR.

No. 377,319. Patented Jan. 31, 1888.

Witnesses:
Jos. H. Blackwood
Jos. Blackwood

Inventor:
Charles T. Mason, Sr.
By his Attorney
W. A. Doolittle

UNITED STATES PATENT OFFICE.

CHARLES T. MASON, SR., OF SUMTER, SOUTH CAROLINA, ASSIGNOR TO THE MARYLAND ELECTRIC MOTOR MANUFACTURING COMPANY OF BALTIMORE CITY.

ELECTRIC MOTOR.

SPECIFICATION forming part of Letters Patent No. 377,319, dated January 31, 1888.

Application filed December 24, 1886. Serial No. 222,486. (No model.)

*To all whom it may concern:*

Be it known that I, CHARLES T. MASON, Sr., a citizen of the United States, residing at Sumter, in the county of Sumter and State of South Carolina, have invented certain new and useful Improvements in Electric Motors; and I do hereby declare the following to be a full, clear, and exact description of the invention, such as will enable others skilled in the art to which it appertains to make and use the same.

My invention relates to axles of electric motors, cars, or other vehicles in which it is necessary or desirable to prevent the transmission of the electric current through the axle from one track or rail or set of tracks or rails to another track or rail or set of tracks or rails, and to axles of every kind in which it is necessary or desirable for any purpose to prevent the transmission of electricity through the axle from one section or sections of the axle to another section or sections of such axle.

One object of my invention is to economize and utilize electric force by separating the electric currents flowing through the tracks or rails, so that the electric current may flow into the electric motor from one track or rail or set of tracks or rails and out of such motor at the other track or rails or set of tracks or rails, instead of flowing directly from one track or rail or set of tracks or rails to the other track or rail or set of tracks or rails through the axle or otherwise.

Another object of my invention is to prevent the transmission of electricity through the axle from any section or sections of the axle to the other section or sections of such axle in any case where it may be necessary or desirable to prevent the same for any purpose.

To this end it consists of a divided axle, in combination with any suitable insulating material placed at the point of separation, constructed as hereinafter described and particularly claimed.

One form of my invention is illustrated in the accompanying drawings, in which—

Figure 1:
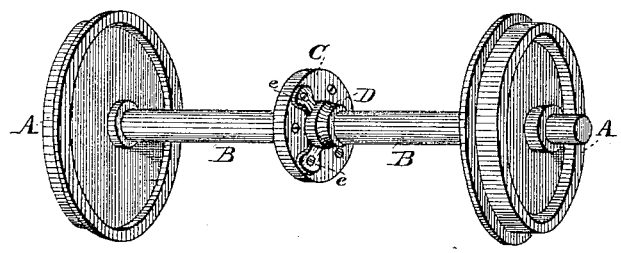
Figure 2:
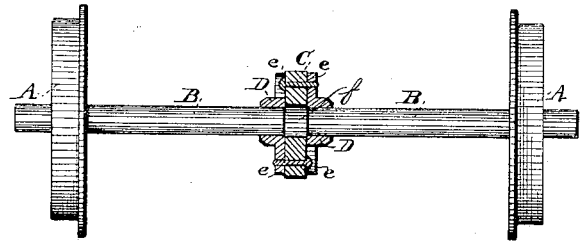
Figure 3:
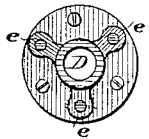

Figure 1 is a perspective view; Fig. 2, a transverse central sectional view, and Fig. 3 a detail.

Referring to the drawings, A A are wheels mounted on sections B B of a divided axle.

C is a block of wood or other insulating or non-conducting material, to the opposite sides of which axle-boxes D are secured by means of screw-bolts passed through the block C and lugs *e*, with which the axle-boxes are provided, and against which the bolts are riveted. As shown, the insulating or non-conducting separating-block C is bored entirely through, and a central recess, *f*, is thus formed between the inner ends of the axle-boxes, at which recess the inner ends of the axle terminates; but the block C may be made solid, and the inner ends of the axle may extend to and abut against it, or nearly so.

The axle-boxes may be screwed, keyed, or otherwise secured to the inner sections of the axle, or they may be cast therewith and the insulating material secured thereto in any suitable manner.

In the drawings, the insulating-block C is shown as screwed to the lugs *e* of the axle-boxes D, the lugs on one side being arranged to come opposite the spaces between the lugs on the other side, so that the screws passing through the lugs on one side may not come in contact with the lugs on the opposite side of the block C, and thus preventing any metallic or other electric conducting connection through such material with the opposite sections of the axle.

As shown in the drawings, the point of separation of the sections of the axle is in the middle of such axle; but, if it is necessary or more convenient for any purpose, said axle may be divided, insulated, and secured, as above set forth, at any other point of the axle; and, if it is necessary or more convenient for any purpose, or to prevent the transmission of electricity along the axle, such axle may be divided, insulated, and secured, as above set forth, at two or more points.

I mention the fact that my invention may be used to divide, insulate, and secure, as above set forth, any section of an axle where it is necessary or desirable to prevent the transmission of electricity through said axle from one section to another, without regard to the number of rails or tracks used, and that the number of wheels may be varied from one to more, or the equivalents of the wheels to be used, the object of the invention being to separate the divided ends of an axle, or its equivalent, by an insulating or non-conducting substance when used on electric motors, street-cars, trucks, or any kind of conveyance in which it is desired to prevent coming and return electric currents from meeting outside of the motor or motors and to force all the electricity first into the motor or motors.

I also state that my invention may be used for insulating sections of an axle used as shafting, or for any other purpose where it is necessary or desirable to prevent the transmission of electricity through the axle from any section or sections of such axle to the other section or sections thereof.

Having described my invention, what I claim is—

1. The combination of an insulating-block and the divided axle provided with means for supporting said block, consisting of lugs so arranged that when said lugs are secured to the said block the lugs on one side of said block will be opposite spaces on the other side of the block, whereby conducting connection through the fastenings for said lugs is prevented, substantially as described.

2. The combination, with the insulating or non-conducting block C, of the divided axle B, the boxes D, provided with the lugs e, so arranged that when said boxes are secured to the said block C the lugs e of the boxes D on one side of the said block C will be opposite the space between the lugs e of the box D on the other side of the said block C, substantially in the manner and for the purpose set forth.

In testimony whereof I affix my signature in presence of two witnesses.

CHARLES T. MASON, SR.

Witnesses:
CHARLES W. DAVIS.
J. W. SCOFFE.